Patented Jan. 28, 1930

1,745,167

UNITED STATES PATENT OFFICE

WILLIAM D. HARRIS AND ROBERT V. AYCOCK, OF KANSAS CITY, MISSOURI, ASSIGNORS TO REFINOIL MANUFACTURING CORPORATION, OF KANSAS CITY, MISSOURI, A CORPORATION OF MISSOURI

PROCESS OF TREATING OIL

No Drawing. Original application filed February 13, 1928, Serial No. 253,951. Divided and this application filed March 8, 1929. Serial No. 345,595.

Our invention relates to a process of treating oil and is a division of our United States application for patent on contact and filter apparatus, Serial No. 253,951, filed Feb. 13, 1928.

The invention is founded on the discovery that the diatomaceous earth used as a reagent in contact apparatus for the clarification, decolorization and neutralization of the oil reacts, as is well known, with the contaminations in the oil to produce a heavy coagulent or sludge and if this sludge is permitted to settle upon an extremely fine mesh screen it will form a highly efficient filter bed through which the treated oil will percolate and be discharged in clarified and filtered condition. In other words, it is based on the conception and discovery of the fact that the sludge produced by contact treatment of oil for the removal of colloidal metals, carbon and other contamination, may be utilized as a filter bed for the treated oil. The invention was produced in connection with the working of the process described in the copending application of Doctor Joseph C. Patrick, Serial No. 229,534, although it will be apparent from the hereinafter contained description of the process that it may be employed with other processes which do not employ the steps outlined in the Patrick process.

The used oil after treatment as described in that application has heretofore been passed through a suitable filter to insure removal of any sediment which might be decanted with the oil. Many hours were consumed in waiting for the proper settling of the sludge, before the oil could be decanted, but by the application of the process hereinafter described the entire process can be consummated in a comparatively short time, as one step, the transfer of the oil from the settling to the filter chamber, is entirely obviated.

Our invention has for its object to produce a process which may be employed as the final step in connection with reclaiming or refining used mineral oils.

In carrying out our process the oil is drawn from a still and introduced into a contact chamber and filter, the walls of which are preferably either double walled or insulated to assist in retaining the heat of the oil as it is discharged from the still, though it will be apparent from the hereinafter contained description that such construction is not a prerequisite for the operation of the process. Within the chamber is preferably mounted a perforated plate and the reagent is contacted with the hot oil above the said plate. It being understood that the action is rather violent, obviously only small amounts of the reagent should be introduced at a time. We have found fuller's earth the most satisfactory form of reagent. Provision should be made for introducing the oil from the still below the perforated plate. The perforations permitting the oil to pass upwardly through the reagent, it is then permitted to settle passing through the perforations in the plate onto a filter screen upon which it forms a porous coagulant or sludge which constitutes the filter bed, as below described. After the oil has been refined within the still, the operator places a sufficient quantity of fuller's earth or equivalent material, to which may have been added any desirable reagent to absolutely insure neutralization of any acid in the oil, upon the contact plate which should be spaced above the bottom of the contact chamber. The hot oil is now introduced below the plate and as described passes upwardly through the clarifying material. This passage of the oil through the reagent produces a heavy coagulant or sludge by the reaction between the contamination in the oil and the active ingredients of the fuller's earth, and this sludge, which, of course, also includes any inactive increase in the fuller's earth, immediately commences to settle, passing through the perforations in the plate onto a screen which should be supported below the contact plate and in spaced relation thereto.

When it is desired to filter the oil, five or six gallons are withdrawn from below the screen and poured back into the top of the tank in order that no oil shall have been untreated by being pocketed below the screen. After a quantity of oil has thus been withdrawn and placed in the apparatus, the oil will slowly percolate through the filter bed provided by the coagulent and may be drawn off ready for use. We have found in practice that this coagulated material acquires oil saturated granulated consistency, and particularly oil discharged therethrough is entirely free from sediment. The advantages in saving of time and expense for special filter equipment and entirely omitting the step of decanting or separately filtering the treated oil are obvious. In other words, it has been found that the character of the fuller's earth is altered by contact with the oil and that if this material is permitted to settle and the entire body of oil passed therethrough, the oil is better clarified than if it were permitted to pass through in one direction only, that is, in its passage through the fuller's earth in one direction only, the advantage of the changed character of the material by the contacting step is lost.

Having described our invention, what we regard as new and desire to secure by Letters Patent is:

1. The process of filtering oil by passing the hot oil upwardly through an active, adsorptive reagent and permitting the said reagent to settle into a bed and then passing the oil through said bed.

2. The process of passing oil upwardly through a reagent to neutralize, decolorize and clarify the oil, permitting said reagent to settle, then drawing the oil through a filter formed by said reagent and the entrapped contamination.

3. The process of treating oil which consists in passing the hot oil as it comes from a still upwardly through an active adsorptive reagent, permitting said reagent to settle, and then passing the oil through the bed formed by said reagent and entrapped contaminations, then drawing off the purified oil.

4. The process of treating oil which comprises the passage of the hot oil from a still to a contact tank, containing a reagent, which reacts with the hot oil to entrap contaminations and automatically forms a filter bed, and then passing the treated oil down through said filter bed.

5. The process of treating oil which comprises the passage of the hot oil from a still to a contact tank containing an active adsorptive reagent, passing the oil upwardly through said reagent, permitting the products of said reaction to settle into a bed, then permitting the oil to percolate through said bed and finally drawing off the purified oil from below said filter bed.

In witness whereof we hereunto subscribe our names.

WILLIAM D. HARRIS.
ROBERT V. AYCOCK.